US012393938B2

(12) United States Patent
Gujar et al.

(10) Patent No.: US 12,393,938 B2
(45) Date of Patent: Aug. 19, 2025

(54) BLOCKCHAIN SYSTEM FOR MINING TRANSACTION USING PARALLEL BLOCKS TO IMPROVE SCALABILITY AND A METHOD THEREOF

(71) Applicant: International Institute of Information Technology, Hyderabad, Hyderabad (IN)

(72) Inventors: Sujit Gujar, Hyderabad (IN); Kannan Srinathan, Hyderabad (IN); Anurag Jain, Hyderabad (IN)

(73) Assignee: INTERNATIONAL INSTITUTE OF INFORMATION TECHNOLOGY, HYDERABAD, Hyderabad (IN)

( * ) Notice: Subject to any disclaimer, the term of this patent is extended or adjusted under 35 U.S.C. 154(b) by 177 days.

(21) Appl. No.: 18/227,862

(22) Filed: Jul. 28, 2023

(65) Prior Publication Data
US 2024/0046263 A1 Feb. 8, 2024

(30) Foreign Application Priority Data
Jul. 28, 2022 (IN) .............................. 202241043386

(51) Int. Cl.
*G06Q 20/38* (2012.01)
*H04L 9/00* (2022.01)
*H04L 9/32* (2006.01)

(52) U.S. Cl.
CPC ....... *G06Q 20/389* (2013.01); *G06Q 20/3825* (2013.01); *G06Q 20/3827* (2013.01);
(Continued)

(58) Field of Classification Search
CPC .......... G06Q 20/3825; G06Q 20/3827; G06Q 20/3829; G06Q 20/389; H04L 9/3239; H04L 9/3247; H04L 9/50
(Continued)

(56) References Cited

U.S. PATENT DOCUMENTS

2018/0294955 A1* 10/2018 Rhie .................... G06F 16/2272
2018/0326291 A1* 11/2018 Tran ..................... G06Q 20/382
(Continued)

FOREIGN PATENT DOCUMENTS

| CN | 117546167 A | * | 2/2024 | ............. G06F 16/27 |
| CN | 112418861 B | * | 6/2024 | ......... G06Q 20/3829 |

OTHER PUBLICATIONS

Jain et al., Interlude: Balancing Chaos and Harmony for Fair and Fast Blockchains, arXiv preprint arXiv:2209.10125 (Sep. 21, 2022) (Year: 2022).*
(Continued)

*Primary Examiner* — David P Zarka

(57) ABSTRACT

A blockchain system for mining a transaction using parallel blocks to improve scalability is provided. The blockchain system includes a sender node, a blockchain network, and mining nodes. The sender node (i) creates a transaction, and (ii) broadcasts the transaction on the blockchain network. Each of the mining nodes is configured to (I) split the transaction into disjoint subsets based on a hash value of the public key; (II) assign the disjoint subsets to a plurality of sub-chains that are mined in parallel by a plurality of miners; (III) mine the parallel block followed by a mining block; and (IV) verify multiple sets of transactions associated with the parallel block using an umbrella-proof-of-work method, thereby improving scalability of the blockchain system.

17 Claims, 10 Drawing Sheets

(52) U.S. Cl.
CPC ....... *G06Q 20/3829* (2013.01); *H04L 9/3239* (2013.01); *H04L 9/3247* (2013.01); *H04L 9/50* (2022.05)

(58) Field of Classification Search
USPC .......................................................... 713/176
See application file for complete search history.

(56) References Cited

U.S. PATENT DOCUMENTS

| | | | |
|---|---|---|---|
| 2020/0014529 A1* | 1/2020 | Kanza ..................... | G07F 9/001 |
| 2021/0194672 A1* | 6/2021 | Narayanam ........... | G06F 9/4418 |
| 2022/0277027 A1* | 9/2022 | Arora .................. | G06F 16/2379 |
| 2025/0018304 A1* | 1/2025 | Shandilya ............... | A63F 13/73 |

OTHER PUBLICATIONS

Jain et al., We might walk together, but I run faster: Network Fairness and Scalability in Blockchains, arXiv preprint arXiv: 2102.04326, pp. 1-12 (Feb. 19, 2021) (Year: 2021).*

Siddiqui et al., BitcoinF: Achieving Fairness for Bitcoin in TransactionFee Only Model, arXiv preprint arXiv:2003.00801, pp. 1-9 (Mar. 2, 2020) (Year: 2020).*

* cited by examiner

BLOCKCHAIN SYSTEM FOR MINING TRANSACTION USING PARALLEL BLOCKS TO IMPROVE SCALABILITY AND A METHOD THEREOF

CROSS-REFERENCE TO RELATED APPLICATIONS

This patent application claims priority to Indian provisional patent application no. 202241043386 filed on Jul. 28, 2022, the complete disclosures of which, in their entirety, are hereby incorporated by reference.

FIELD OF THE INVENTION

The present disclosure relates generally to the blockchain, and more particularly, the present disclosure relates to a blockchain system for mining at least one transaction using at least one parallel block to improve the scalability of the blockchain system.

BACKGROUND

Blockchain is a distributed ledger of recording information in blocks that is secure, immutable, and operates without a central authority. The blockchain is duplicated and distributed across the entire network of computer systems on the blockchain. As new information comes in, it is filled into a new block. After filling the new block with the new information, the block is closed and securely linked to a previously filled valid block via cryptography, thus forming a chain of data known as the blockchain. Different types of information may be stored on the blockchain. Most commonly, blockchain is used as a distributed ledger for transactions.

Typically, a transaction must go through several steps before adding to the blockchain. Once the transaction is agreed between users, the transaction needs to be approved, or authorized, before it is added to a block in the chain. For a public blockchain, the decision to add the transaction to the chain is made by a consensus mechanism known as proof of work (PoW). Consensus means that a majority of nodes or computers in a blockchain network must agree that the transaction is valid. Proof of work requires the people who own the computers in the network to solve a complex mathematical problem to add a block to the chain. Solving the problem is known as mining, and people solving the problem are known as 'miners' The miners are incentivized to verify transactions through rewards.

There have been multiple blockchain protocols proposed since the Nakamoto consensus (original Bitcoin protocol). Blockchain protocols may be broadly classified into two types: (i) linear blockchain protocols, and (ii) non-linear blockchain protocols. The linear blockchain protocols are structurally similar to the Nakamoto consensus which resembles a linear chain of blocks that grows with time, while non-linear blockchain protocols adopt a DAG-based architecture (directed acyclic graph). The most distinctive design feature between linear blockchain, and non-linear blockchain is the ability to include conflicting blocks in the main chain. Conflicting blocks may arise when multiple miners create blocks at the same time and try to add them to the previously filled valid block of the blockchain. While non-linear blockchain protocols may include conflicting blocks in the main chain, the linear blockchain protocol only includes non-conflicting blocks in the main chain by orphaning the rest of the blocks. Thus, non-linear blockchain protocols require an explicit block ordering algorithm while this order is implicit in linear blockchains. However, linear blockchains are a sub-class of non-linear blockchain protocols.

Further, existing blockchain approaches are not scalable and are not able to increase transaction processing speed while maintaining security properties. Likewise, existing blockchain approaches are not designed for an environment with asymmetric internet connectivity of miners, leading to a lack of network fairness, i.e., slower participants get less than their fair share of reward while the faster ones get more than their fair share. Also, existing blockchain approaches are not immune against incentive-driven deviations which may potentially threaten the security of blockchain protocols.

Therefore, there arises a need to address the aforementioned technical drawbacks in existing technologies for proof of work-based blockchain.

SUMMARY

In view of the foregoing, an embodiment herein provides a blockchain system for mining at least one transaction using at least one parallel block to improve a scalability of the blockchain system. The blockchain system includes a sender node and a blockchain network. The sender node (i) creates at least one transaction, and (ii) broadcasts the at least one transaction on a blockchain network. The at least one transaction is in a pending status for verification by at least one miner. The at least one transaction includes (a) a pointer to a previous unspent transaction output, and (b) a signature with a public key that is signed to the previous unspent transaction output. The blockchain network comprises a plurality of mining nodes. The plurality of mining nodes is configured to receive the at least one transaction. Each of the plurality of mining nodes comprises a memory that stores a set of instructions and a processor that is configured to (I) split the at least one transaction into disjoint subsets based on a hash value of the public key that is used to sign the at least one transaction; (II) assign the disjoint subsets to a plurality of sub-chains that are mined in parallel by a plurality of miners, each sub-chain comprises blocks that comprise the at least one transaction that is signed by the public key; (III) mine the at least one parallel block followed by a mining block, the at least one parallel block comprises the disjoint subsets of the at least one transaction, the mining block comprises a plurality of pointers to all preceding parallel blocks; and (IV) verify multiple sets of transactions associated with the at least one parallel block using an umbrella-proof-of-work method, thereby improving a scalability of the blockchain system.

In some embodiments, the blockchain system comprises a receiving node that is configured to receive a chain comprising the at least one transaction to exceed any other chain not including the at least one transaction by kappa blocks before accepting the at least one transaction, the kappa blocks are security parameters chosen by any recipient, the chain comprises the at least one parallel block In some embodiments, each of the plurality of mining nodes is configured to verify the multiple sets of transactions associated with the at least one parallel block using the umbrella-proof-of-work method by generating a merkle tree of the multiple sets of transactions, a block header of the at least one parallel block comprises a root of the merkle tree, each mining node has a number of chances of processing transactions proportional to a mining power of corresponding mining node and is independent of an internet speed In some embodiments, the multiple sets of transactions are indexed using last bits of the public key that signs the at least one transaction.

In some embodiments, the at least one parallel block is defined based on (i) all parallel blocks have same top set, (ii) no two blocks of the at least one parallel block shares a same sub-chain, and (iii) no two blocks of the at least one parallel block has a same root of the merkle tree.

In some embodiments, the mining block is configured to mine after mining the at least one parallel block, the mining block comprises the pointer to the parallel block.

In some embodiments, a chain is valid if (i) the mining block on the chain comprises a hash pointer to a valid set of parallel blocks, (ii) the mining block comprises a valid nonce, (iii) the at least one parallel block comprises the pointer to the mining block, (iv) the at least one parallel block comprises the valid nonce.

In some embodiments, the chain is selected based on (i) the chain with more number of mining blocks, (ii) the chain with lower hash for the mining block, (iii) the at least one parallel block with a least hash value.

In one aspect, there is provided a method for mining at least one transaction of a blockchain system using at least one parallel block to improve a scalability of a blockchain system. The method includes creating, by a sender node, at least one transaction, and broadcasting the at least one transaction on a blockchain network, the at least one transaction is in a pending status for verification by at least one miner, the at least one transaction comprises (a) a pointer to a previous unspent transaction output, and (b) a signature with a public key that is signed to the previous unspent transaction output. The method includes receiving, by a plurality of mining nodes, the at least one transaction through a blockchain network. The method includes splitting the at least one transaction into disjoint subsets based on a hash value of the public key that is used to sign the at least one transaction. The method includes assigning the disjoint subsets to a plurality of sub-chains that are mined in parallel by a plurality of miners, each sub-chain comprises blocks that comprise the at least one transaction that is signed by the public key. The method includes mining the at least one parallel block followed by a mining block, wherein the at least one parallel block comprises the disjoint subsets of the at least one transaction, wherein the mining block comprises a plurality of pointers to all preceding parallel blocks. The method includes verifying multiple sets of transactions associated with the at least one parallel block using an umbrella-proof-of-work method, thereby improving a scalability of the blockchain system.

In some embodiments, the blockchain system comprises a receiving node that is configured to receive a chain comprising the at least one transaction to exceed any other chain not including the at least one transaction by kappa blocks before accepting the at least one transaction, the kappa blocks are security parameters chosen by any recipient, the chain comprises the at least one parallel block In some embodiments, each of the plurality of mining nodes is configured to verify the multiple sets of transactions associated with the at least one parallel block using the umbrella-proof-of-work method by generating a merkle tree of the multiple sets of transactions, a block header of the at least one parallel block comprises a root of the merkle tree, each mining node has a number of chances of processing transactions proportional to a mining power of corresponding mining node and is independent of an internet speed In some embodiments, the multiple sets of transactions are indexed using last bits of the public key that signs the at least one transaction.

In some embodiments, the at least one parallel block is defined based on (i) all parallel blocks have same top set, (ii) no two blocks of the at least one parallel block shares a same sub-chain, and (iii) no two blocks of the at least one parallel block has a same root of the merkle tree.

In some embodiments, the mining block is configured to mine after mining the at least one parallel block, the mining block comprises the pointer to the parallel block.

In some embodiments, a chain is valid if (i) the mining block on the chain comprises a hash pointer to a valid set of parallel blocks, (ii) the mining block comprises a valid nonce, (iii) the at least one parallel block comprises the pointer to the mining block, (iv) the at least one parallel block comprises the valid nonce.

In some embodiments, the chain is selected based on (i) the chain with more number of mining blocks, (ii) the chain with lower hash for the mining block, (iii) the at least one parallel block with a least hash value.

In another aspect, one or more non-transitory computer-readable storage mediums configured with instructions executable by one or more processors cause the one or more processors to perform a method for mining at least one transaction of a blockchain system using at least one parallel block to improve a scalability of a blockchain system. The method includes creating, by a sender node, at least one transaction, and broadcasting the at least one transaction on a blockchain network, the at least one transaction is in a pending status for verification by at least one miner, the at least one transaction comprises (a) a pointer to a previous unspent transaction output, and (b) a signature with a public key that is signed to the previous unspent transaction output. The method includes receiving, by a plurality of mining nodes, the at least one transaction through a blockchain network. The method includes splitting the at least one transaction into disjoint subsets based on a hash value of the public key that is used to sign the at least one transaction. The method includes assigning the disjoint subsets to a plurality of sub-chains that are mined in parallel by a plurality of miners, each sub-chain comprises blocks that comprise the at least one transaction that is signed by the public key. The method includes mining the at least one parallel block followed by a mining block, wherein the at least one parallel block comprises the disjoint subsets of the at least one transaction, wherein the mining block comprises a plurality of pointers to all preceding parallel blocks. The method includes verifying multiple sets of transactions associated with the at least one parallel block using an umbrella-proof-of-work method, thereby improving a scalability of the blockchain system.

A blockchain system and method for mining transactions using parallel blocks to improve scalability are provided. The blockchain system enables scalability, increases transaction processing speed while maintaining security improves network fairness, and is immune against incentive-driven deviations. The blockchain system enables decentralization, and transparency as well. In the context of parallel processing with a k-set of parallel blocks, the blockchain system enhances scalability by handling multiple transactions simultaneously through parallel blocks. The system ensures data integrity, fault tolerance, and consensus through cryptographic hashing and various consensus mechanisms. Blockchain's decentralized nature makes it resilient to attacks and allows users to have control over their data, promoting trust, accountability, and cross-border transactions without intermediaries.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed descriptions with reference to the drawings, in which.

DETAILED DESCRIPTION OF PREFERRED EMBODIMENTS

Figure 1:
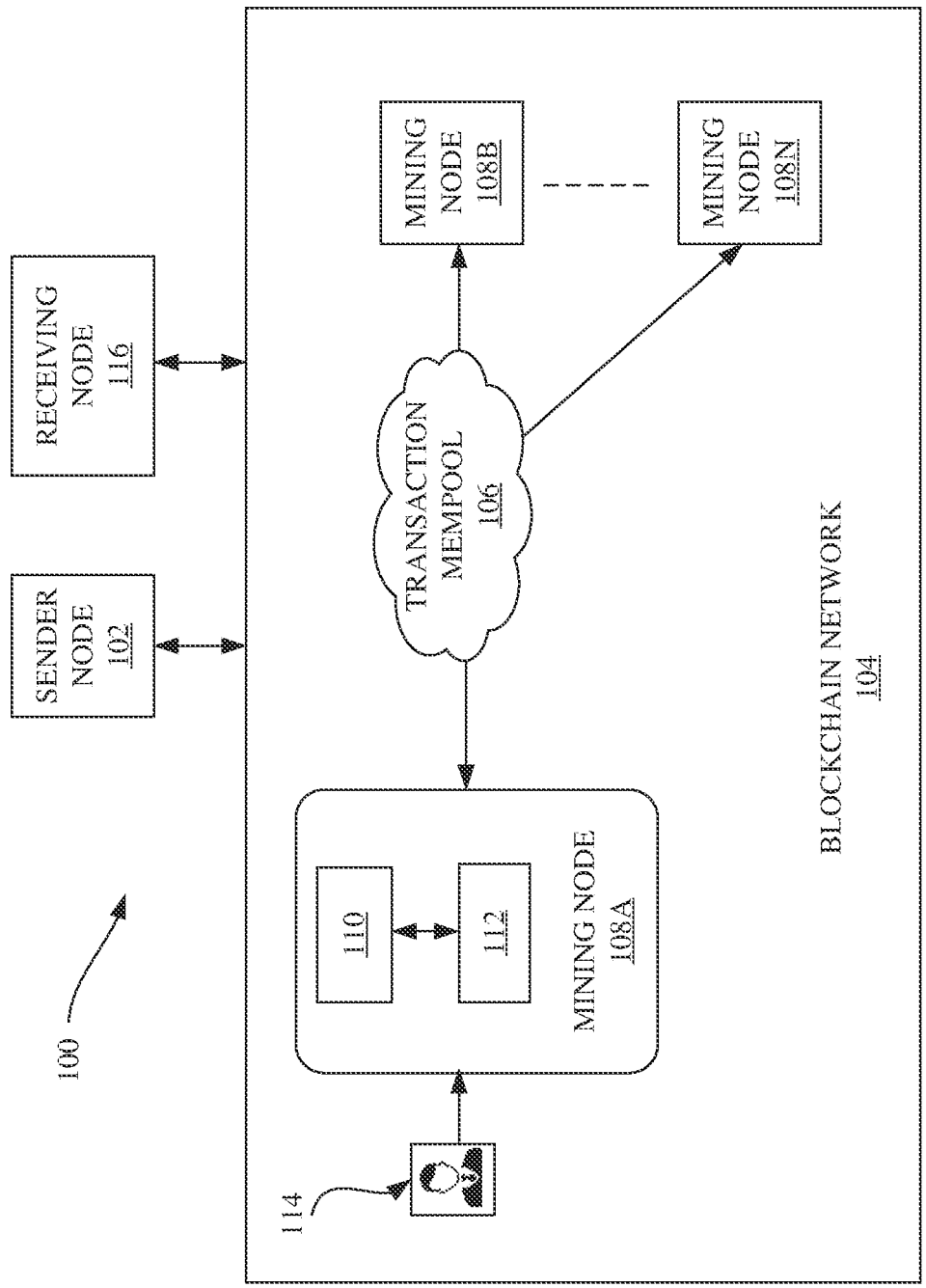
FIG. 1 is a block diagram that illustrates a blockchain system for mining a transaction using parallel blocks to improve a scalability of the blockchain system, according to some embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for an improved approach that overcomes technical drawbacks and delays in existing technologies for proof-of-work-based blockchain.

The embodiments herein achieve this by providing a proof-of-work-based blockchain with alternate layers of parallel blocks followed by a single block which enables scalability, increases transaction processing speed while maintaining security, improves network fairness, and is immune against incentive-driven deviations. Referring now to the drawings and more particularly to FIGS. 1 through 9, where similar reference characters denote corresponding features consistently throughout the figures, there are shown preferred embodiments.

Transaction: A transaction is associated with public keys $a1, a2, \ldots, as$, and $b1, b2, \ldots b1$, transfers a sum the cryptocurrency from a total balance $a1, a2, \ldots,$ as to the total balance of $b1, b2, \ldots b1$.

Sub-chain: A sub-chain with index i includes blocks that only include transactions that are signed by a public key that has last $\log_2 (k)$ bits as i.

FIG. 1 is a block diagram that illustrates a blockchain system 100 for mining a transaction using parallel blocks to improve a scalability of the blockchain system 100, according to some embodiments herein. The blockchain system 100 includes a sender node 102, a blockchain network 104, and a receiving node 116. The blockchain network 104 includes a transaction mempool 106, and a plurality of mining nodes 108A-N. The blockchain network 104 may operate on a peer-to-peer network. Each mining node in the blockchain network 104 is communicatively connected with each other. The sender node 102 initiates a transaction with the receiver node 118 through the blockchain network 104. The blockchain system 100 may include one or more sender nodes that create one or more transactions with a signature. The sender node 102 may include but is not limited to, a personal computer, a laptop, a tablet device, a smartphone, a mobile communication device, a personal digital assistant, any other such computing device, or any virtual device.

The sender node 102 i) creates a transaction and (ii) broadcasts the transaction on the blockchain network 104, pending verification by miners. The transaction includes (a) a pointer to a previous unspent transaction output, and (b) a signature with a same public key that signed the previous unspent transaction output. The sender node 102 may be any node in the blockchain system 100 that may issue a signed transaction where the signature is verifiably linked to his/her account information. The transaction mempool 106 stores a plurality of transactions that are broadcasted by one or more sender nodes after validating the transactions. The transaction mempool 106 is communicatively coupled with each node in the blockchain system 100. The blockchain system 100 may store the plurality of transactions in the transaction mempool 106 after the one or more sender nodes initiate the transactions.

The blockchain system 100 transmits the one or more transactions that are valid to the plurality of mining nodes 108A-N via a network. The plurality of mining nodes 108A-N may be any node in the blockchain system 100. The network may be a local area network (LAN), a wide area network (WAN), a public network, a private network, a proprietary network, a public telephone switched network (PSTN), the Internet, a wireless network, a virtual network, or any combination thereof. Each of the plurality of mining nodes 108A-N comprises a memory 110 that stores a set of instructions and a processor 112 that is configured to execute the set of instructions to perform one or more operations related to splitting and assigning the transaction to sub-chains. A mining node 108A is configured to split the transaction into disjoint subsets based on a hash value of the public key that is used to sign the transaction. Thereby, two transactions that belong to different sets may never conflict with each other while mining. In some embodiments, the mining node 108A split the plurality of transactions into the disjoint subsets based on a hash value of a previous transaction output.

The mining node 108A assigns the disjoint subsets to one or more sub-chains that are mined in parallel by one or more miners. Each sub-chain includes blocks that include the transaction that is signed by the public key. Thereby, enabling scalability and network fairness in a single attempt since a number of miners contending for the same transaction set would split across the subsets. Each of the plurality of mining nodes 108A-N stores a blockchain locally. Each of the plurality of mining nodes 108A-N may be, but is not limited to, a computer, a mobile terminal, or any dedicated electronic device with a computing ability to split and assign the transactions.

Thereafter, the mining node 108A is configured to perform mining of the parallel block followed by a mining block. For example, the mining node 108A mines a k-set of parallel blocks including disjoint subsets of transactions followed by the mining block. The mining node 108A includes pointers to the k-set of parallel blocks, synchronizing an entire network. The mining node 108A verifies multiple sets of transactions associated with the parallel block using an umbrella-proof-of-work method. For example, a mining node 108A is associated with a miner 114.

In an exemplary embodiment, for example, if a user, Alice, in a decentralized social media platform, wants to make a new post, then the transaction may be created that includes (i) an input of Content: "Hello, this is my first post!" and a signature of Alice using her private key, and (ii) an output of a public key "0xabcdef1234567890". The transaction containing the post is broadcasted by the sender node 102 to the other mining nodes 108A-N in the blockchain network 104 for verification and inclusion in the blockchain system 100.

The mining nodes 108A-N in the blockchain network 104 receive the transaction of Alice. The transaction is split into disjoint subsets based on the hash value of Alice's public key 0xabcdef1234567890. For example, the transaction of Alice is split into two disjoint subsets, for example, subset1, and subset2. For example, subset1 includes (i) the input of Content: "Hello, this is my first post!" and the signature of Alice using her private key, and (ii) the output of a public key "0xabcdef1234567890". For example, subset2 includes (i) an input of Content: "Hello, this is Bob's post!" and a signature of Bob using his private key, and (ii) an output of a public key "0x1234567890abcdef". Bob may be another user.

The subset1 and subset2 are assigned to different sub-chains that are mined in parallel by different miners. Each miner may work on mining their respective sub-chain. For example, miner1 mines parallel block1. The parallel block1 includes the subset1 transaction.

For example, miner2 mines parallel block2. The parallel block2 includes the subset2 transaction. The parallel block1 and the parallel block2 are verified using the umbrella-proof-of-work method, ensuring that the transactions are valid and consistent. Once the parallel block1 and the parallel block2 are verified, then the parallel block1 and the parallel block2 are added to the main blockchain, and Alice's and Bob's posts are now recorded in the blockchain system 100.

In some embodiments, a k-set of parallel blocks followed by a k/2 set of parallel blocks followed by two mining blocks or any other pattern may be used. In some embodiments, proof-of-stake or proof-of-storage is used as a consensus mechanism.

The receiving node 116 is configured to receive a chain including the transaction to exceed any chain not including the transaction by 'kappa' blocks before accepting the transaction where 'kappa' is the security parameter chosen by any recipient.

Figure 2:
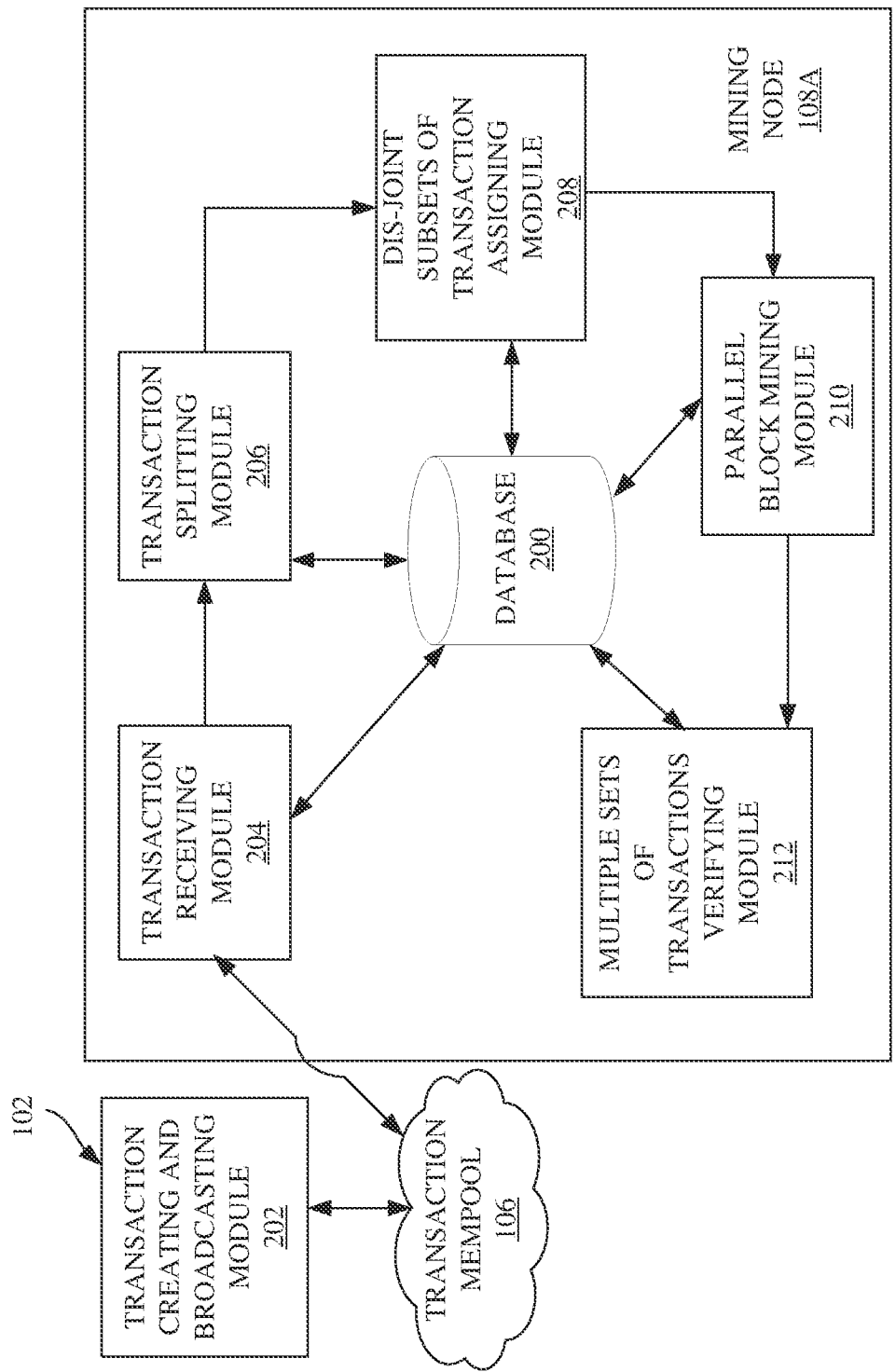
FIG. 2 is a block diagram of a mining node and a sender node according to some embodiments herein.

FIG. 2 is a block diagram of a mining node 108A and a sender node 102 according to some embodiments herein. The sender node 102 includes a transaction creating and broadcasting module 202. The transaction creating and broadcasting module 202 creates a transaction and broadcasts the transaction on the blockchain network 104. The transaction includes (a) a pointer to a previous unspent transaction output, and (b) a signature with a public key that is signed to the previous unspent transaction output. The transaction mempool 106 stores the transaction that is broadcasted by the sender node 102 after validating the transaction. The transaction mempool 106 stores the transaction after the sender node 102 initiates the transaction.

The mining node 108 includes a database 200, a transaction receiving module 204, a transaction splitting module 206, a dis-joint subsets of transaction assigning module 208, a parallel block mining module 210, and a multiple sets of transactions verifying module 212.

The transaction receiving module 204 receives the transaction through the blockchain network.

The transaction splitting module 206 splits the transaction into disjoint subsets based on a hash value of the public key that is used to sign the transaction.

The dis-joint subsets of transaction assigning module 208 assigns the disjoint subsets to one or more sub-chains that are mined in parallel by one or more miners. Each sub-chain includes blocks that include the transaction that is signed by the public key.

The parallel block mining module 210 mines the parallel block followed by a mining block. The parallel block includes the disjoint subsets of the transaction. The mining block includes one or more pointers to all preceding parallel blocks.

The mining block is configured to mine after mining the parallel block. The mining block includes the pointer to the parallel block.

The multiple sets of transactions verifying module 212 verifies multiple sets of transactions associated with the parallel block using an umbrella-proof-of-work method, thereby improving a scalability of the blockchain system 100.

The multiple sets of transactions verifying module 212 generate a merkle tree of the multiple sets of transactions. A block header of the parallel block includes a root of the merkle tree. Each mining node has a number of chances of processing transactions proportional to the mining power of the corresponding mining node and is independent of internet speed. The multiple sets of transactions are indexed using the last bits of the public key that signs the at least one transaction.

The parallel block is defined based on (i) all parallel blocks have same top set, (ii) no two blocks of the at least one parallel block shares the same sub-chain, and (iii) no two blocks of the at least one parallel block has a same root of the merkle tree.

The chain is valid if (i) the mining block on the chain includes a hash pointer to a valid set of parallel blocks, (ii) the mining block includes a valid nonce, (iii) the parallel block includes the pointer to the mining block, (iv) the parallel block includes the valid nonce.

The chain is selected based on (i) the chain with more number of mining blocks, (ii) the chain with lower hash for the mining block, and (iii) the parallel block with a least hash value.

In some embodiments, the blockchain system 100 includes a receiving node 116 that is configured to receive a chain. The chain includes the transaction to exceed any other chain not including the transaction by kappa blocks before accepting the transaction. The kappa blocks are security parameters chosen by any recipient. The chain includes the parallel block.

Figure 3:
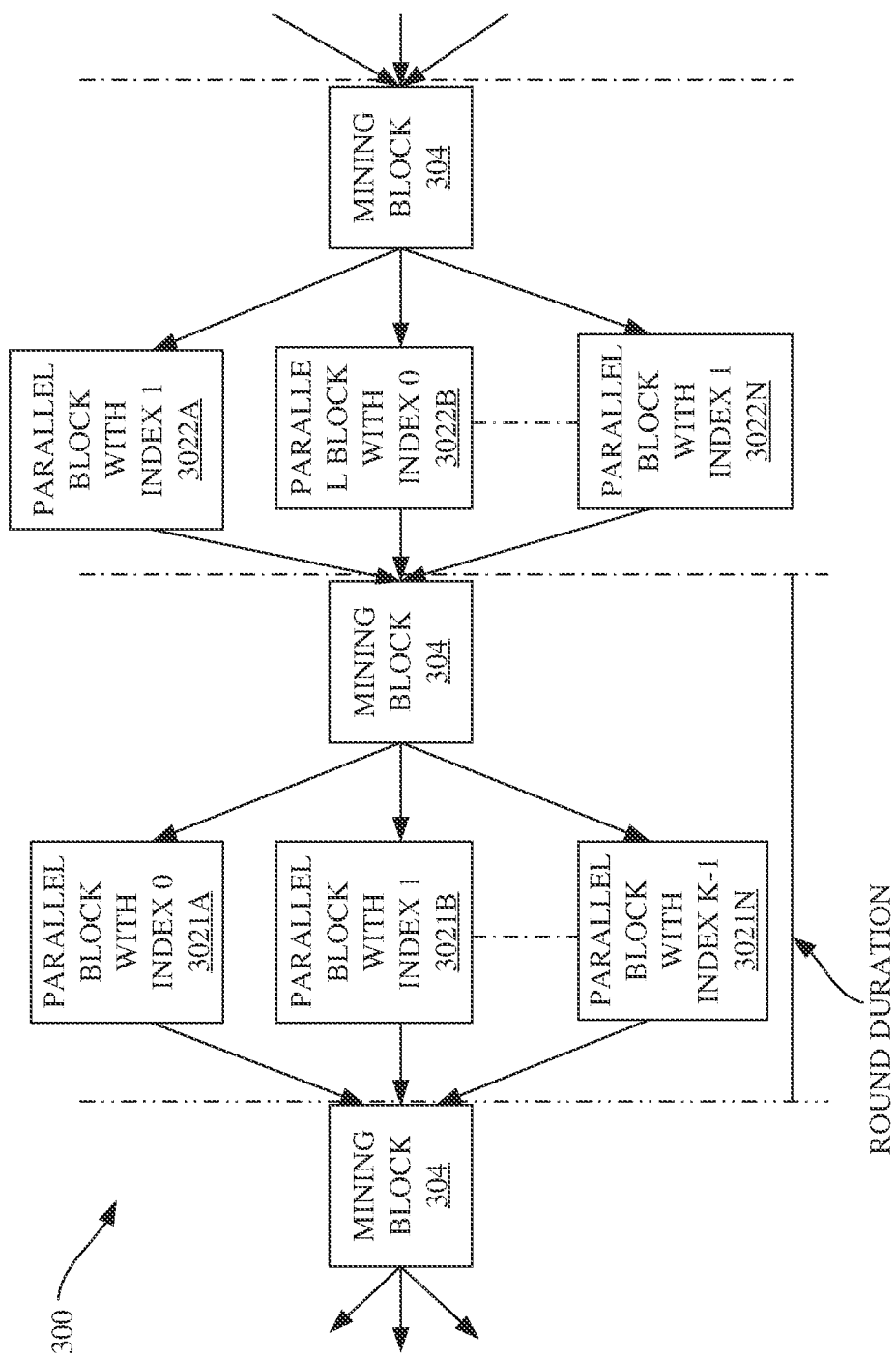
FIG. 3 is an exemplary illustration of a chain of parallel blocks and mining blocks, according to some embodiments herein.

FIG. 3 is an exemplary illustration of a chain of parallel blocks and mining blocks, according to some embodiments herein. The blockchain 300 includes a k-set of parallel blocks 302A-N and a mining block 304 after each k-set of parallel blocks 302. The first k-set of parallel blocks 3021A-N includes disjoint sets of transactions. The mining block 304A includes pointers to the first k-set of parallel blocks, synchronizing the entire network. The first k-set of parallel blocks 3021A-N shares the following properties: (i) all blocks have the same top set, (ii) no two blocks share the same sub-chain, (iii) no two blocks have the same Merkle root or nonce.

In the exemplary embodiment, both parallel block1 and parallel block2 are part of the first k-set of parallel blocks 3021A-N. The term "top set" refers to the set of transactions that are common and included in all the blocks within the first k-set of parallel blocks 3021A-N. That means both parallel block1 3021A and parallel block2 3021B have the same top set because they contain transactions related to Alice's post. The top set includes transactions that are necessary for the functioning and security of the blockchain system 100 and are typically agreed upon by the network participants.

The term "sub-chain" refers to a part of the blockchain that contains specific transactions. In the context of parallel block1 and parallel block2, the sub-chain refers to the disjoint subsets of transactions that were split based on the hash value of the public keys. In the example, parallel block1 includes subset1, which has transactions related to Alice's post, and parallel block2 includes subset2, which has transactions related to Bob's post. Since subset1 and subset2 are disjoint, no two blocks (parallel block1 and parallel block2) share the same sub-chain.

The term "Merkle root" is a cryptographic hash that represents the entire set of transactions within a block. It is computed by hashing the transaction data in a specific way, creating a unique fingerprint for that set of transactions. The term "nonce" refers to a random number used in the process of mining a block. Miners modify the nonce repeatedly until a valid block hash is found. The combination of the nonce and the transaction data results in a unique block hash.

In the exemplary embodiment, parallel block1 and parallel block2 will have different transactions (Alice's post and Bob's post), resulting in different Merkle roots. Additionally, since miners work independently on their respective sub-chains, they will use different nonces while mining the blocks. As a result, no two blocks within the k-set of parallel blocks will have the same Merkle root or nonce.

Figure 4:
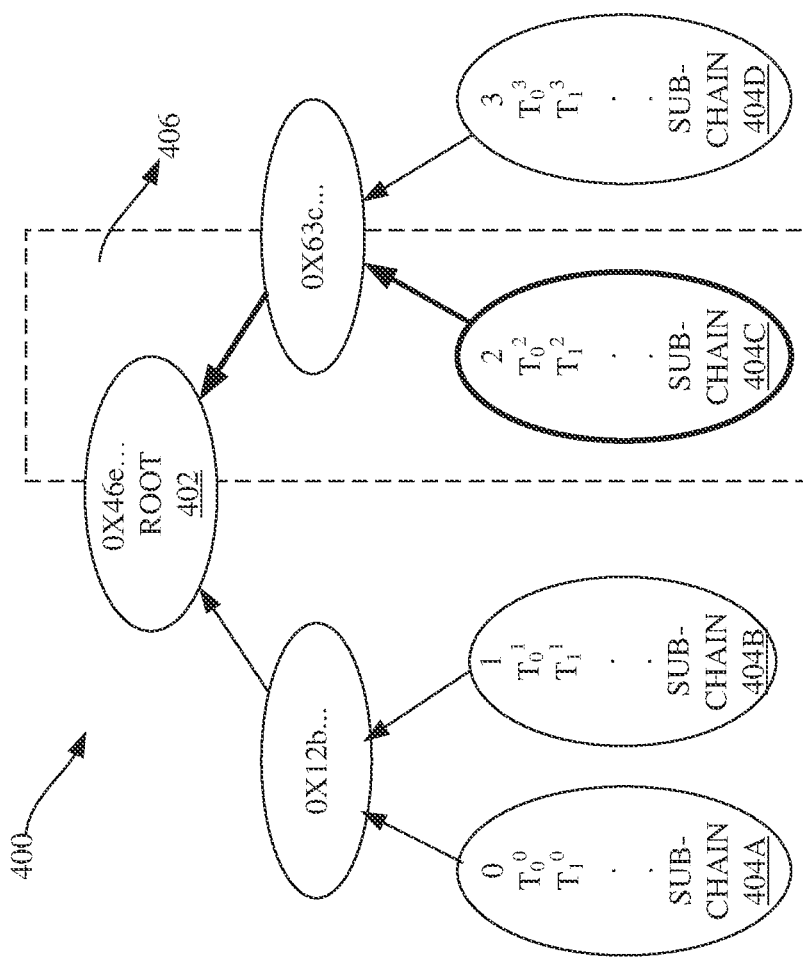
FIG. 4 is an exemplary illustration of a merkle tree that is generated using an umbrella-proof-of-work method according to some embodiments herein.

FIG. 4 is an exemplary illustration of a merkle tree 400 that is generated using an umbrella-proof-of-work method according to some embodiments herein. Each mining node verifies the multiple sets of transactions associated with the parallel blocks. Each parallel block includes disjoint subsets of transactions, and these disjoint subsets are assigned to sub-chains 404A-404D. The Merkle tree 400 of multiple sets of transactions is generated using the umbrella-proof-of-work method. A block header includes a root 402 of the Merkle tree 400. For example, the block header is 0x46e . . . as shown in the figure. The multiple sets of transactions form the branches of the merkle tree 400. For example, a branch 406 as shown in the figure represents a set of transactions from the root 402 to a sub-chain 404C.

The merkle tree 400 is a tree that uses cryptographic functions to efficiently perform integrity checks on the data stored in the leaves of the merkle tree. Each parallel block includes the root 402 of the merkle tree 400. The multiple sets of transactions are indexed using the last bits of the public key that signs the transaction.

The merkle tree 400 includes a single transaction set and a Merkle proof for the corresponding branch of the Merkle tree 400. This means the next block includes the hash pointer to the previous block and the Merkle proof contained in the previous block. Thus, any modification in any transaction in the block invalidates the root of the Merkle tree 400. Furthermore, in the case of a fork in parallel blocks, a copy of the block on another sub-chain can be published. The fork refers to a divergence of the blockchain into separate chains. A double-spending transaction belongs to the same sub-chain since it needs to be signed by the same public key. A valid chain may not contain any double-spending transactions, as the chain includes only one block at a particular position in the sub-chain. Thereby, the parallel blocks are mined without network synchronization.

Figure 5:
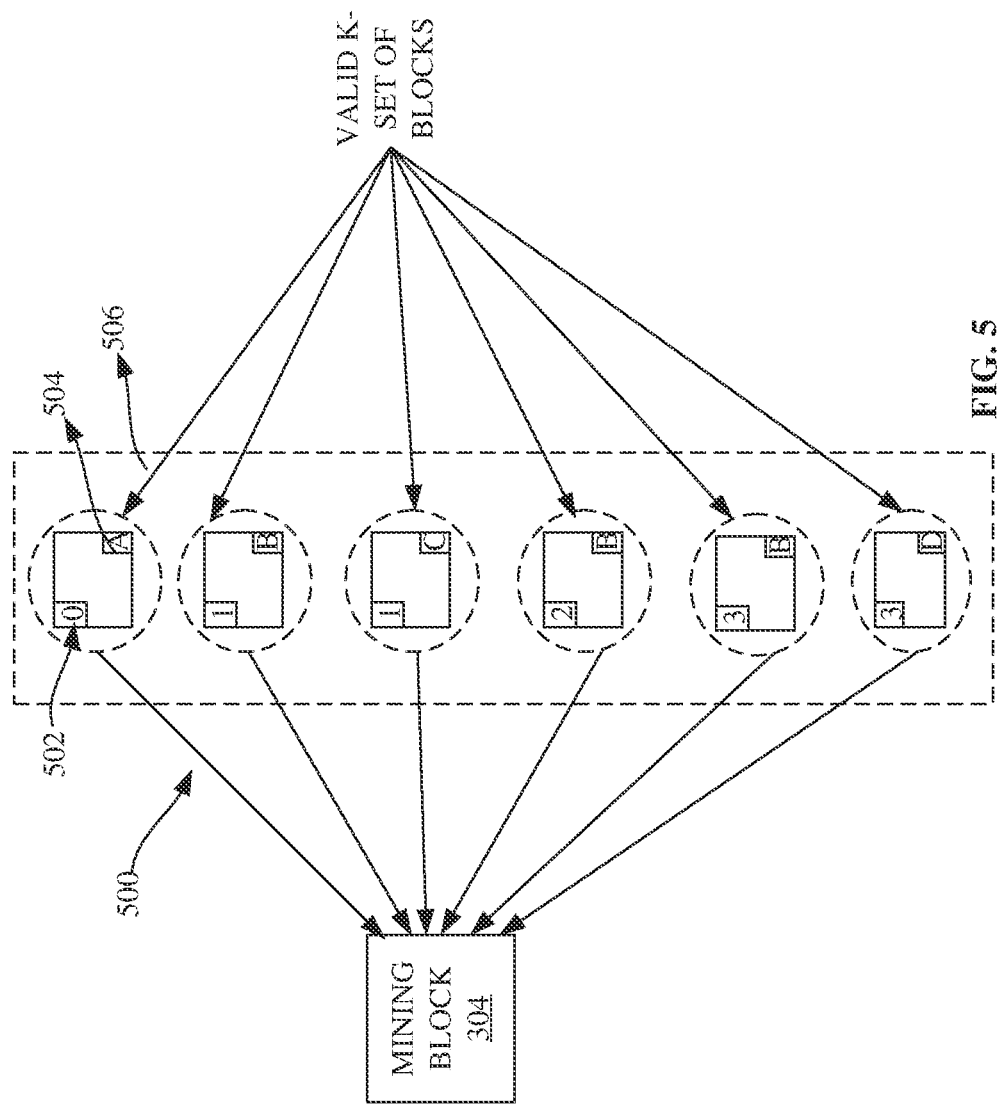
FIG. 5 is an exemplary illustration of the validation of a k-set of parallel blocks according to some embodiments herein.

FIG. 5 is an exemplary illustration 500 of the validation of a k-set of parallel blocks according to some embodiments herein. The exemplary illustration 500 includes the mining block 304, a valid k-set of parallel blocks 506, an index of sub-chains 502, and copies of the same block with a different transaction set 504. The k-set of parallel blocks is defined based on (i) all parallel blocks having the same top set, (ii) no two blocks of the at least one parallel block sharing the same sub-chain, and (iii) no two blocks of the at least one parallel block having the same root of the Merkle tree. Each parallel block is considered valid by including transactions belonging to only one sub-chain and a valid set of transactions with a hash pointer to the mining block. The mining block is valid by including both typical and non-typical transactions belonging to any sub-chain and also includes a valid set of transactions that do not conflict with any transaction in any of the preceding blocks. The mining block includes hash pointers to the valid k-set of parallel blocks along with corresponding Merkle proofs.

A chain is considered valid if (i) the mining block on the chain includes a hash pointer to the valid k-set of parallel blocks, (ii) the mining block includes a valid nonce, (iii) the parallel block includes the pointer to the mining block, (iv) the parallel block includes the valid nonce.

In the exemplary embodiment, for example, the mining block may be mining blockx. The mining blockx includes a hash pointer to the combined and valid k-set of parallel block1 and parallel block2. To be considered valid, the mining blockx must have a valid nonce. Miners try different nonce values until they find one that, when combined with the other block data, results in a block hash that meets the difficulty criteria of the blockchain network. The parallel block1 may include a reference (pointer) to the mining blockx where it will be included. The reference pointer ensures that parallel block1 is part of the valid chain and is properly linked to the mining blockx. The reference pointer maintains the chronological order and validity of transactions in the blockchain. For parallel block1 to be considered valid, it must have a valid nonce. Miners working on parallel block1 try different nonce values until they find one that results in a block hash meeting the difficulty target set by the blockchain network. The blockchain system ensures that the chain, including both the mining block and the k-set of parallel blocks, is valid and secure. This process helps maintain the integrity and consistency of the blockchain as it grows with new transactions and blocks.

The chain is selected based on (i) the chain with more number of mining blocks, (ii) the chain with a lower hash for the mining block, (iii) the parallel block with the least hash value.

For example, there are chain A and chain B. Chain A has 5 mining blocks, while chain B has 6 mining blocks. Hence, chain B with 6 mining blocks will be selected as the valid chain.

For example, chain A and chain B both have 6 mining blocks. The hash of the latest mining block in chain A is lower than the hash of the latest mining block in chain B. Hence, chain A will be selected as the valid chain.

For example, parallel block1 and parallel block2 are both vying to be included in the mining blockx, and then the hash of parallel block1 is lower than the hash of parallel block2. In this case, parallel block1 will be selected and included in the mining blockx.

The blockchain system ensures that the longest and most valid chain with the most computational effort is chosen, while also providing a fair mechanism for selecting parallel blocks to maintain the security, integrity, and consensus in the blockchain network.

Figure 6:
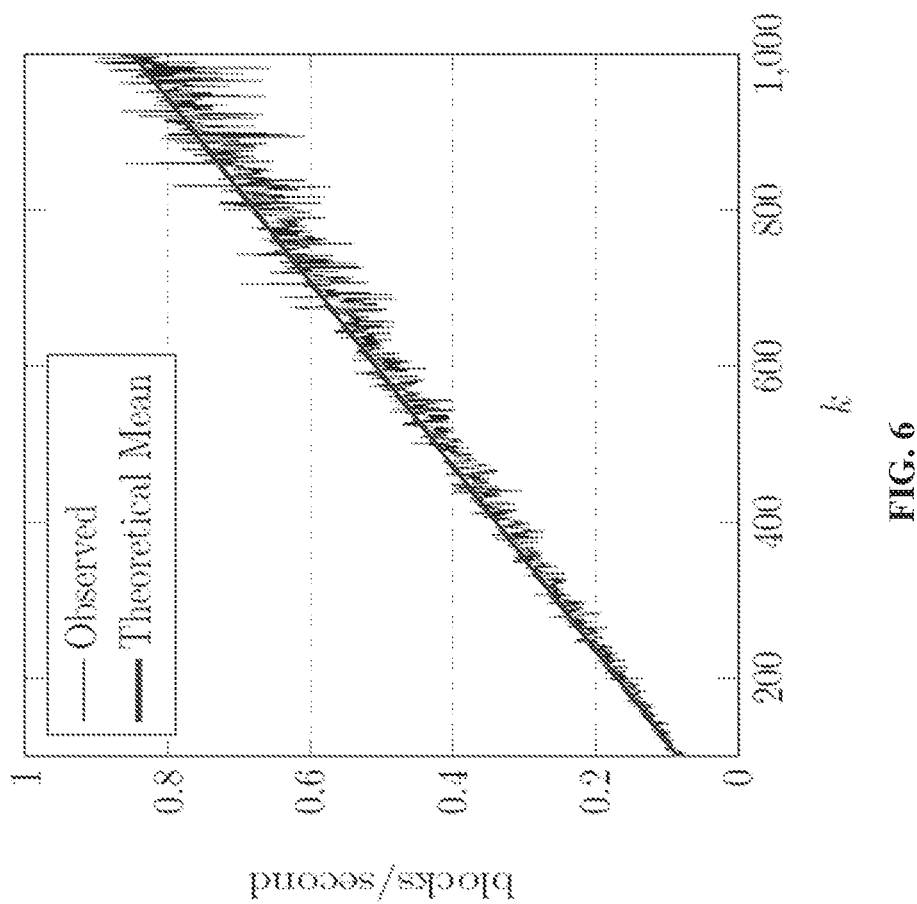
FIG. 6 is a graphical representation of the throughput of the blockchain system according to some embodiments herein.

FIG. 6 is a graphical representation of throughput of the blockchain system 100 according to some embodiments herein. The graphical representation of throughput of the blockchain system depicts blocks per second on the Y axis and a security parameter k on the X axis. The transaction rate scales linearly with the number of sub-chains. For a block size of 1 megabyte (MB), the bitcoin blockchain can accommodate nearly 1500 transactions. Thus, when operating at 1 block per second, the blockchain system 100 achieves a performance of 1700 transactions per second.

Figure 7:
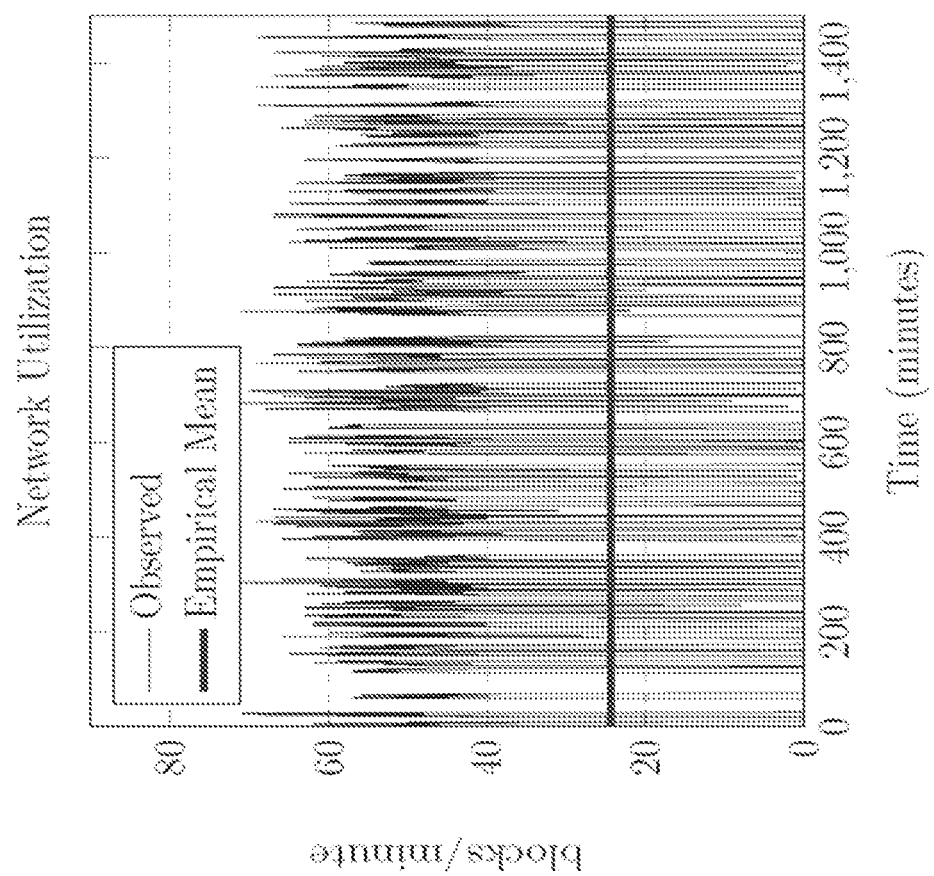
FIG. 7 is a graphical representation of network utilization of the blockchain system according to some embodiments herein.

FIG. 7 is a graphical representation of network utilization of the blockchain system 100 according to some embodiments herein. The graphical representation of network utilization of the blockchain system depicts blocks per minute on the Y axis and time on the X axis. A periodic plot is shown, correlating the network utilization with time. The average network utilization is twice the baseline for 50% of the time, while the blockchain network 104 remains idle for the other 50% of the time. Consequently, the blockchain network 104 experiences high utilization during the mining of parallel blocks, while it remains relatively silent during the mining of the main block.

Figure 8A:
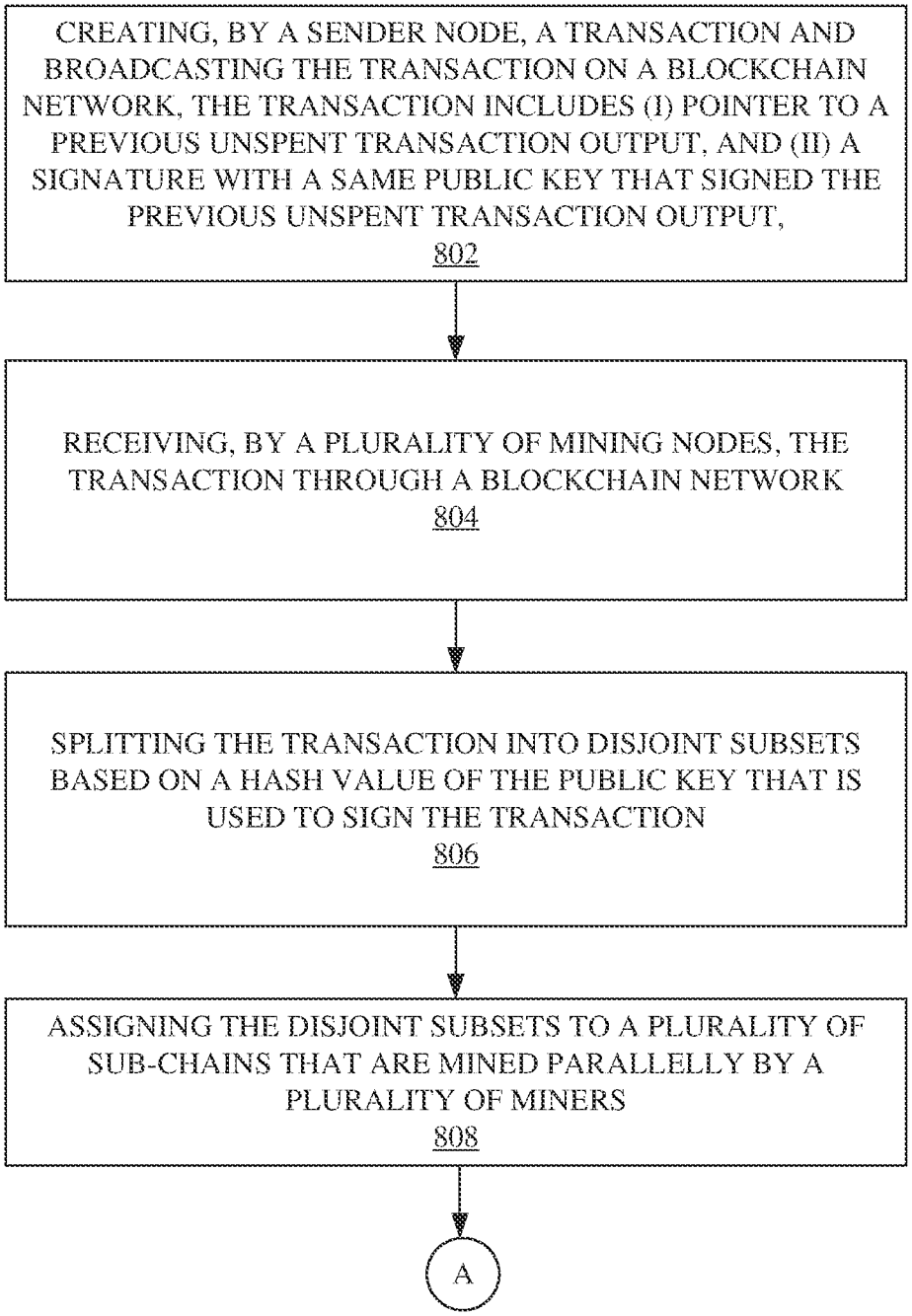
FIGS. 8A and 8B are flow charts that illustrate a method for mining a transaction using parallel blocks to improve a scalability of a blockchain system, according to some embodiments herein.
Figure 8B:
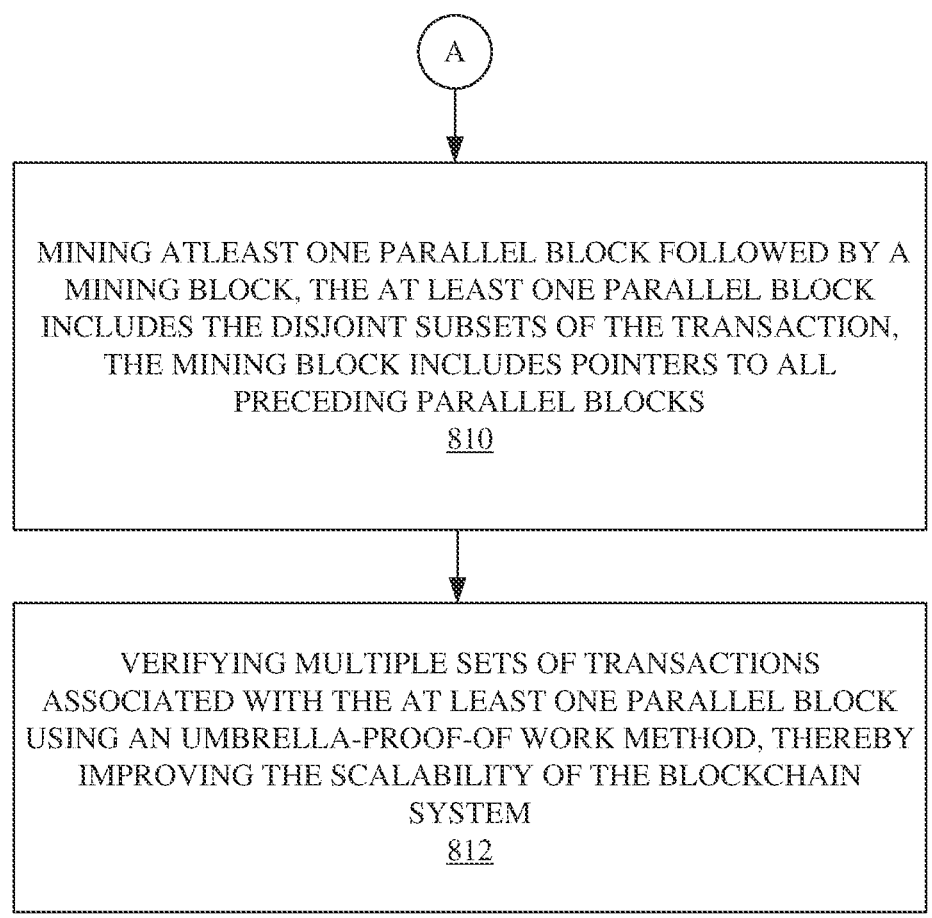

FIGS. 8A and 8B are flow charts that illustrate a method for mining a transaction using parallel blocks to improve a scalability of a blockchain system, according to some embodiments herein. At step 802, the method includes creating, by a sender node, at least one transaction, and broadcasting the at least one transaction on a blockchain network. The transaction is in a pending status for verification by at least one miner. The transaction includes (a) a pointer to a previous unspent transaction output, and (b) a signature with a public key that is signed to the previous unspent transaction output. At step 804, the method includes receiving, by a plurality of mining nodes, the transaction through a blockchain network. At step 806, the method includes splitting the at least one transaction into disjoint subsets based on a hash value of the public key that is used to sign the at least one transaction. At step 808, the method includes assigning the disjoint subsets to a plurality of sub-chains that are mined in parallel by a plurality of miners, thereby improving a scalability of the blockchain system. Each sub-chain includes blocks that include the at least one transaction that is signed by the public key. At step 810, the method includes mining the at least one parallel block followed by a mining block. The parallel block includes the disjoint subsets of the transaction. The mining block includes a plurality of pointers to all preceding parallel blocks. At step 812, the method includes verifying multiple sets of transactions associated with the at least one parallel block using an umbrella-proof-of-work method, thereby improving a scalability of the blockchain system.

Figure 9:
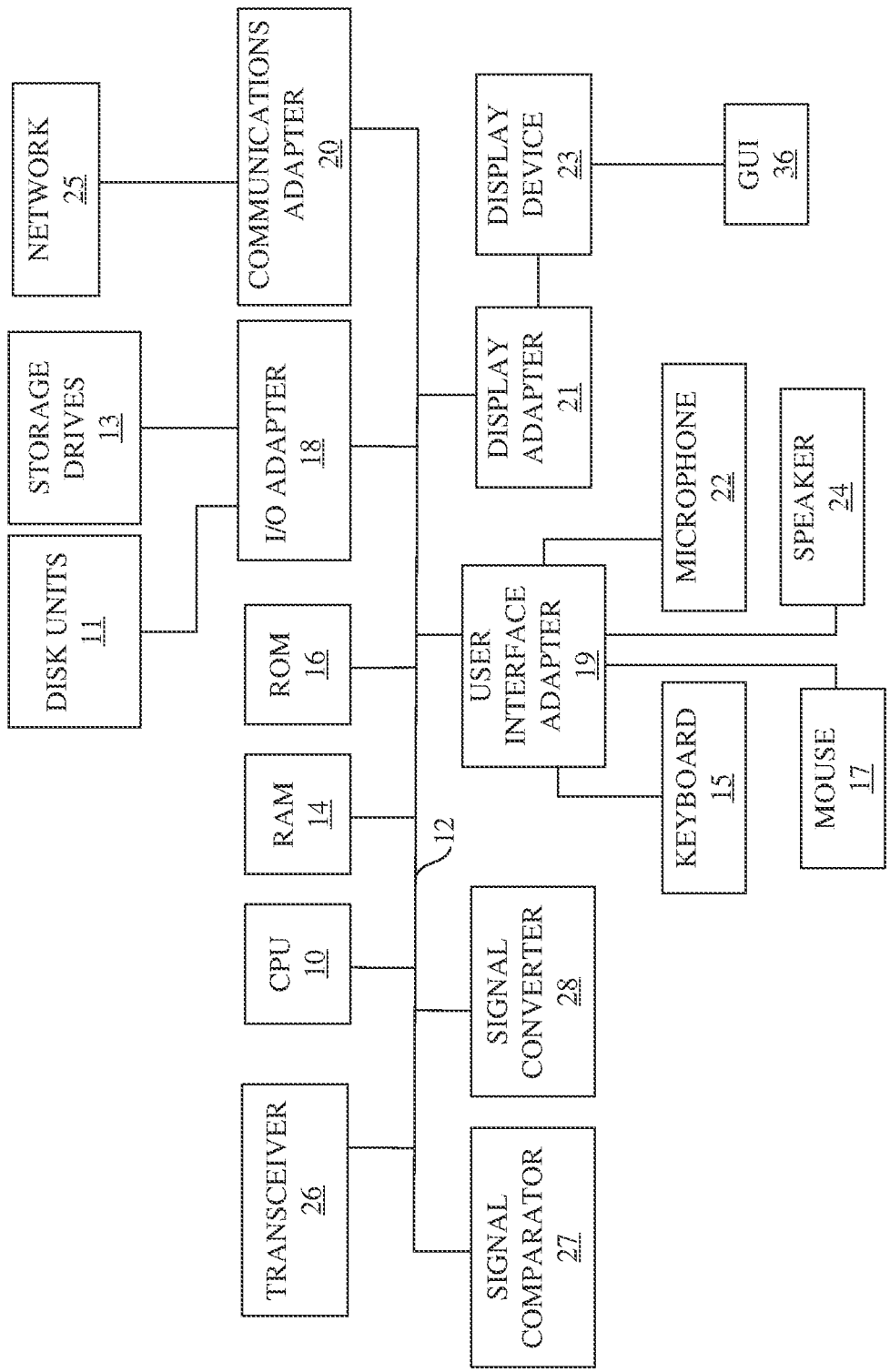
FIG. 9 is a schematic diagram of computer architecture, in accordance with the embodiments herein.

A representative hardware environment for practicing the embodiments herein is depicted in FIG. 9 with reference to FIGS. 1 through 8A and 8B. This schematic drawing FIG. 9 illustrates a hardware configuration of a blockchain system or a sender node or a miner node or a receiver node, in accordance with the embodiments herein. The hardware configuration includes at least one processing device and a cryptographic processor 10. The blockchain system may include one or more of a personal computer, a laptop, a tablet device, a smartphone, a mobile communication device, a personal digital assistant, or any other such computing device, in one example embodiment. The system includes one or more processor (e.g., the processor 104) or central processing unit (CPU) 10. The CPUs 10 are interconnected via system bus 12 to various devices such as a random-access memory (RAM) 14, read-only memory (ROM) 16, and an input/output (I/O) adapter 18. Although, CPUs 10 are depicted, it is to be understood that the system may be implemented with only one CPU.

The I/O adapter 18 can connect to peripheral devices, such as disk units 11 and storage drives 13 (tape drives), or other program storage devices that are readable by the system. The system can read the inventive instructions on the program storage devices and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a network 25, and a display adapter 21 connects the bus 12 to a display device 23, which provides a graphical entity interface (GUI) 36 of the output data in accordance with the embodiments herein, or which may be embodied as an output device such as a monitor, printer, or transmitter, for example. Further, a transceiver 26, a signal comparator 27, and a signal converter 28 may be connected with the bus 12 for processing, transmission, receipt, comparison, and conversion of electric signals.

The embodiments herein can take the form of, an entirely hardware embodiment, an entirely software embodiment or an embodiment including both hardware and software elements. The embodiments that are implemented in software include but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random-access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing or executing program code will include at least one processor coupled directly or indirectly to memory elements through a system bus. The memory elements can include local memory employed during actual execution of the program code, bulk storage, Subscriber Identity Module (SIM) card, and cache memories which provide temporary storage of at least some program code in order to reduce the number of times code must be retrieved from bulk storage during execution. Input/output (I/O) devices (including but not limited to keyboards, displays, pointing devices, remote controls, camera, microphone, temperature sensor, accelerometer, gyroscope, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of employed herein is for the purpose of description and not of limitation. Therefore, while the embodiments herein have been described in terms of preferred embodiments, those skilled in the art will recognize that the embodiments herein can be practiced with modification within the scope of appended claims.

What is claimed is:

1. A blockchain system for mining at least one transaction using at least one parallel block to improve a scalability of the blockchain system, wherein the blockchain system comprises,
a sender node that (i) creates at least one transaction, and (ii) broadcasts the at least one transaction on a blockchain network, wherein the at least one transaction is in a pending status for verification by at least one miner, wherein the at least one transaction comprises (a) a pointer to a previous unspent transaction output, and (b) a signature with a public key that is signed to the previous unspent transaction output;
the blockchain network comprises a plurality of mining nodes, wherein the plurality of mining nodes is configured to receive the at least one transaction, wherein each of the plurality of mining nodes comprises,
a memory that stores a set of instructions;
a processor that is configured to
split the at least one transaction into disjoint subsets based on a hash value of the public key that is used to sign the at least one transaction;
assign the disjoint subsets to a plurality of sub-chains that are mined in parallel by a plurality of miners, wherein each sub-chain comprises blocks that comprise the at least one transaction that is signed by the public key;
mine the at least one parallel block followed by a mining block, wherein the at least one parallel block comprises the disjoint subsets of the at least one transaction, wherein the mining block comprises a plurality of pointers to all preceding parallel blocks; and
verify multiple sets of transactions associated with the at least one parallel block using an umbrella-proof-of-work method, thereby improving a scalability of the blockchain system.

2. The blockchain system of claim 1, wherein the blockchain system comprises a receiving node that is configured to receive a chain comprising the at least one transaction to exceed any other chain not including the at least one transaction by kappa blocks before accepting the at least one transaction, wherein the kappa blocks are security parameters chosen by any recipient, wherein the chain comprises the at least one parallel block.

3. The blockchain system of claim 1, wherein each of the plurality of mining nodes is configured to verify the multiple sets of transactions associated with the at least one parallel block using the umbrella-proof-of-work method by generating a merkle tree of the multiple sets of transactions, wherein a block header of the at least one parallel block comprises a root of the merkle tree, wherein each mining node has a number of chances of processing transactions proportional to a mining power of corresponding mining node and is independent of an internet speed.

4. The blockchain system of claim 1, wherein the multiple sets of transactions are indexed using last bits of the public key that signs the at least one transaction.

5. The blockchain system of claim 1, wherein the at least one parallel block is defined based on (i) all parallel blocks have same top set, (ii) no two blocks of the at least one parallel block shares a same sub-chain, and (iii) no two blocks of the at least one parallel block has a same root of the merkle tree.

6. The blockchain system of claim 1, wherein the mining block is configured to mine after mining the at least one parallel block, wherein the mining block comprises the pointer to the parallel block.

7. The blockchain system of claim 1, wherein a chain is valid if (i) the mining block on the chain comprises a hash pointer to a valid set of parallel blocks, (ii) the mining block comprises a valid nonce, (iii) the at least one parallel block comprises the pointer to the mining block, (iv) the at least one parallel block comprises the valid nonce.

8. The blockchain system of claim 7, wherein the chain is selected based on (i) the chain with more number of mining blocks, (ii) the chain with lower hash for the mining block, (iii) the at least one parallel block with a least hash value.

9. A method for mining at least one transaction of a blockchain system using at least one parallel block to improve a scalability of a blockchain system, the method comprising:
creating, by a sender node, at least one transaction, and broadcasting the at least one transaction on a blockchain network, wherein the at least one transaction is in a pending status for verification by at least one miner, wherein the at least one transaction comprises (a) a pointer to a previous unspent transaction output, and (b) a signature with a public key that is signed to the previous unspent transaction output;

receiving, by a plurality of mining nodes, the at least one transaction through a blockchain network;

splitting the at least one transaction into disjoint subsets based on a hash value of the public key that is used to sign the at least one transaction;

assigning the disjoint subsets to a plurality of sub-chains that are mined in parallel by a plurality of miners, wherein each sub-chain comprises blocks that comprise the at least one transaction that is signed by the public key;

mining the at least one parallel block followed by a mining block, wherein the at least one parallel block comprises the disjoint subsets of the at least one transaction, wherein the mining block comprises a plurality of pointers to all preceding parallel blocks; and verifying multiple sets of transactions associated with the at least one parallel block using an umbrella-proof-of-work method, thereby improving a scalability of the blockchain system.

10. The method of claim 9, wherein the blockchain system comprises a receiving node that is configured to receive a chain comprising the at least one transaction to exceed any other chain not including the at least one transaction by kappa blocks before accepting the at least one transaction, wherein the kappa blocks are security parameters chosen by any recipient, wherein the chain comprises the at least one parallel block.

11. The method of claim 9, further comprises verifying, by each of the plurality of mining nodes, the multiple sets of transactions associated with the at least one parallel block using the umbrella-proof-of-work method by generating a merkle tree of the multiple sets of transactions, wherein a block header of the at least one parallel comprises a root of the merkle tree, wherein each mining node has a number of chances of processing transactions proportional to a mining power of corresponding mining node and is independent of an internet speed.

12. The method of claim 9, wherein the multiple sets of transactions are indexed using last bits of the public key that signs the at least one transaction.

13. The method of claim 9, wherein the at least one parallel block is defined based on (i) all parallel blocks have same top set, (ii) no two blocks of the at least one parallel block shares a same sub-chain, and (iii) no two blocks of the at least one parallel block has a same root of the merkle tree.

14. The method of claim 9, wherein the mining block is configured to mine after mining the at least one parallel block, wherein the mining block comprises the pointer to the parallel block.

15. The method of claim 9, wherein the at least one parallel block is valid if (i) the mining block on a chain comprises a hash pointer to a valid set of parallel blocks, (ii) the mining block comprises a valid nonce, (iii) the at least one parallel block comprises the pointer to the mining block, (iv) the at least one parallel block comprises the valid nonce.

16. The method of claim 9, wherein the chain is selected based on (i) the chain with more number of mining blocks, (ii) the chain with lower hash for the mining block, (iii) the at least one parallel block with a least hash value.

17. One or more non-transitory computer readable storage mediums storing one or more sequences of instructions, which when executed by one or more processors, causes a method for mining at least one transaction of a blockchain system using at least one parallel block to improve a scalability of a blockchain system, comprising:

creating, by a sender node, at least one transaction, and broadcasting the at least one transaction on a blockchain network, wherein the at least one transaction is in a pending status for verification by at least one miner, wherein the at least one transaction comprises (a) a pointer to a previous unspent transaction output, and (b) a signature with a public key that is signed to the previous unspent transaction output;

receiving, by a plurality of mining nodes, the at least one transaction through a blockchain network;

splitting each of the at least one transaction into disjoint subsets based on a hash value of the public key that is used to sign the at least one transaction;

assigning the disjoint subsets to a plurality of sub-chains that are mined in parallel by a plurality of miners, wherein each sub-chain comprises blocks that comprise the at least one transaction that is signed by the public key;

mining the at least one parallel block followed by a mining block, wherein the at least one parallel block comprises the disjoint subsets of the at least one transaction, wherein the mining block comprises a plurality of pointers to all preceding parallel blocks; and verifying multiple sets of transactions associated with the at least one parallel block using an umbrella-proof-of-work method, thereby improving a scalability of the blockchain system.

* * * * *